United States Patent [19]

Wimmer

[11] 4,163,825

[45] Aug. 7, 1979

[54] THREADS OR FIBERS OF POLYTETRAFLUORETHYLENE

[75] Inventor: Adalbert Wimmer, Vöcklabruck, Austria

[73] Assignee: Chemiefaser Lenzing Aktiengesellschaft, Lenzing, Austria

[21] Appl. No.: 858,390

[22] Filed: Dec. 7, 1977

[30] Foreign Application Priority Data

Dec. 7, 1976 [AT] Austria ................................ 9037/76

[51] Int. Cl.$^2$ ...................... B65D 53/06; F16C 33/20; F16J 15/20; F16J 15/22
[52] U.S. Cl. .......................................... 428/368; 87/1; 277/227; 308/238; 308/DIG. 8; 308/DIG. 9; 427/430 R; 428/378; 428/391; 428/394
[58] Field of Search ................. 87/1, 8; 277/229, 230, 277/227; 308/238, DIG. 8, DIG. 9; 428/368, 378, 391, 394; 19/149; 83/913

[56] References Cited

U.S. PATENT DOCUMENTS

| 3,586,597 | 6/1971 | Okuhashi | 428/368 |
|---|---|---|---|
| 3,708,335 | 1/1973 | Fujiwara et al. | 428/378 |
| 3,823,035 | 7/1974 | Sanders | 428/368 |
| 3,844,195 | 10/1974 | Rhodes et al. | 87/1 |
| 3,878,031 | 4/1975 | Dormer | 277/230 |

FOREIGN PATENT DOCUMENTS 1946349 3/1971 Fed. Rep. of Germany ............... 87/1

*Primary Examiner*—J. C. Cannon
*Attorney, Agent, or Firm*—Brumbaugh, Graves, Donohue & Raymond

[57] ABSTRACT

A method of making threads or fibres of polytetrafluorethylene with improved heat conductibility uses thread of fibre cores enclosed by envelopes which contain fine-particle polytetrafluorethylene, a heat conducting pigment and a binder. Such threads or fibres can be used to form a sealing packing.

34 Claims, 2 Drawing Figures

THREADS OR FIBERS OF POLYTETRAFLUORETHYLENE

BACKGROUND OF THE INVENTION

The invention relates to threads or fibres of polytetrafluorethylene with improved heat conductibility, as well as a method of producing the same, and a sealing packing.

Threads of polytetrafluorethylene are customarily produced in a matrix-spinning or paste extrusion procedure, in which fine-particle polytetrafluorethylene is suspended in a viscose and is spun together with the same. After spinning the threads are subjected to a thermal treatment, in which the matrix disintegrates and the polytetrafluorethylene fibres sinter together.

According to another known method threads of polytetrafluorethylene can be produced from a cylinder of the material fastened to a turning lathe and rotated relative to a cutting tool. As a result a curtain of parallel threads is pealed off and, if desired, stretched under heating. The threads produced according to this method are marked by uniform individual titres and high firmness.

It has been known to mix threads or fibres of polytetrafluorethylene with asbestos fibres, to interlace the mixture in order to form sealing packages and, if desired, to subject the latter to an post interlace treatment with an aqueous polytetrafluorethylene dispersion as well as with antifriction agents. These packages mixed of polytetrafluorethylene and asbestos are, however, poor heat conductors, thus being limited in their application. Particularly in application fields where machine parts are working at high speed and high pressure, the poor heat conductibility of the packages results in a hardening and destruction of the packages, the machine parts thus being damaged.

Many experiments have been made to improve the heat conductibility of threads of polytetrafluorethylene. An attempt was made, for instance, when producing the threads, to add heat conducting pigments, such as soot, to the polytetrafluorethylene pastes and to spin them together with the pastes. These experiments were not very successful. Pigment containing threads produced in the paste extrusion method did not show a remarkable improvement in the heat conductibility.

SUMMARY OF THE INVENTION

The present invention aims at avoiding the mentioned disadvantages and difficulties and has as its object to produce threads or fibres of polytetrafluorethylene with improved heat conductibility, which fibres can be applied universally. For example, the fibres should be capable of being interlaced to form sealing packages that constantly conduct away the heat very well, this heat conductibility should not be reduced by abrasion or washing out. Besides, the textile qualities of polytetrafluorethylene threads and yarns, respectively, should not be negatively influenced.

This object is achieved according to the invention in that the threads or fibres are provided with an envelope consisting of fine-particle polytetrafluorethylene, a heat conducting pigment, such as soot or graphite, and a binder.

Advantageously, the weight of the envelope is 10 to 200% by weight, preferably 80 to 100% by weight of the weight of the basic threads or fibres or thread or fibre cores, the envelope's content of the heat conducting pigment amounting to 30 to 90% by weight, preferably to about 70% by weight.

These threads or fibres have titers of 500 to 20,000 dtex, preferably 10,000 to 20,000 dtex.

BRIEF DESCRIPTION OF THE DRAWINGS

The present invention will now be described in more detail by way of the accompanying drawing in which.

DESCRIPTION OF EXEMPLARY EMBODIMENTS

Figure 1:
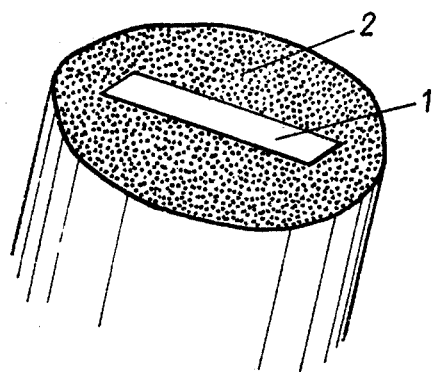
FIG. 1 is a perspective view of a cross section of a single thread according to the invention and FIG. 2 shows a bundle of such threads.

Experiments with threads or fibres composed according to the invention have shown that the heat conductibility as well as the electric conductivity are considerably higher than those of known threads. This effect is based on a homogenous composition of the individual pigment particles within the thread envelope. The effect obtained according to the invention is convicingly reflected in the determination of the specific surface resistance. This resistance, in known polytetrafluorethylene threads, is in the range of more than $10^{18}$ $\Omega$/cm and is reduced, in the threads composed according to the invention, to a range of $10^4$ $\Omega$/cm. These threads are to an extraordinary degree suited for the production of sealing packings and also have an extraordinarily high durability when used with quickly rotating shafts and high pressures.

The invention also comprises a method of producing the described threads or fibres, in which a basic filament or a basic yarn of polytetrafluorethylene is avived by being immersed into an aqueous dispersion containing 30 to 70% by weight, (preferably 50 to 60% by weight) of solids, including 30 to 90% by weight of a fine-particle conductible pigment such as soot or graphite, (preferably 70% by weight), and 10 to 70% by weight (preferably 30% by weight), of fine-particle polytetrafluorethylene, and an emulsifying agent in an amount up to 5% by weight, based on the amount of solids. The excess dispersion is squeezed off, and the avived filaments or yarns are dried and, if desired, before being quilled, are treated with an antifriction agent—preferably silicone fluid—or, if desired, are cut into staple fibres.

The graphite is preferably used as a mixture of powdered graphite and natural graphite. The departing material for producing the dispersion is a commercial 20 to 70% by weight polytetrafluorethylene dispersion in water containing an emulsifying agent. Graphite powder is introduced into this dispersion and a small amount of a binder or an additional emulsifying agent, respectively, can be added thereto until the desired viscosity is achieved, which can be 50 to 1,000 cP, preferably between 100 and 200 cP. This viscosity is considerably higher than the viscosity of commercial polytetrafluorethylene dispersions, whose viscosity number is about 10 to 12 cP. By adjusting this high viscosity it is possible to keep the portion of solids in the envelope within very wide limits and to keep the envelope's content of the heat-conductible pigment very high, as was mentioned before. The binder used and the added emulsifying agent can be made up on the basis of reaction products of octylphenol and ethylenoxide, for instance of the formula $C_8H_{17}-C_6H_4-(OCH_2CH_2)_n-OH$. It is sold under the label "Triton X 155".

In order to increase the antifriction properties of the threads advantageously 2 to 40% by weight, preferably 15% by weight, of silicone fluid, based on the total weight of the threads, can be used, thus facilitating quilling.

The threads according to the invention and the method for producing the same shall now be described in more detail by way of the following examples:

EXAMPLE 1

4.20 kg of powdered graphite with a powder density of 375 g/l and 0.21 kg of emulsifying agent triton in 2.59 kg of water were added to 3.00 kg of an aqueous dispersion of polytetrafluorethylene with a content of 60% by weight of solids. The result was 10 kg of a conductible polytetrafluorethylene dispersion with a total solid content of 60% by weight and a viscosity of 100 cP.

A polytetrafluorethylene basic yarn with a titre of 10,000 dtex was immersed in the dispersion and the surface of the yarn was stripped with a fork. The impregnated yarn is dried. The dried product had a titre of 20,000 dtex, a very good heat conductibility, and the advantage of being interlaceable to form sealing packages.

EXAMPLE 2

3.85 kg of graphite and 0.14 kg of emulsifying agent triton X 155 in 3.26 kg of water were introduced into 2.75 kg of a commercial aqueous polytetrafluorethylene dispersion with a polytetrafluorethylene content of 60% by weight. The result was 10 kg of a dispersion mixture with a content of solids equal to 55% by weight. This dispersion mixture had a viscosity of 30 cP and was used for impregnating polytetrafluorethylene basic yarns, which were interlaced to form sealing packages.

EXAMPLE 3

As described in the examples 1 and 2, 10 kg of a polytetrafluorethylene dispersion were produced by mixing 6.43 kg of an aqueous polytetrafluorethylene dispersion with a solid content of 35% by weight, 2.25 kg of electrode graphite, 0.09 kg of emulsifying agent and 1.23 kg of water. The dispersion mixture had a total solid content of 45% by weight and a viscosity of 15 cP. It can be used as described in the above-mentioned examples.

In FIG. 1 there is a perspective illustration of a single polytetrafluorethylene thread with a titre of about 20 dtex. The cross section of the thread 1 is rectangular, since such threads, according to the split-pealing method, are milled off a rotating roller consisting of solid polytetrafluorethylene. The thread 1 is embedded in an envelope 2 consisting of fine-particle polytetrafluorethylene, a heat conducting pigment, such as soot or graphite and a binder.

Figure 2:
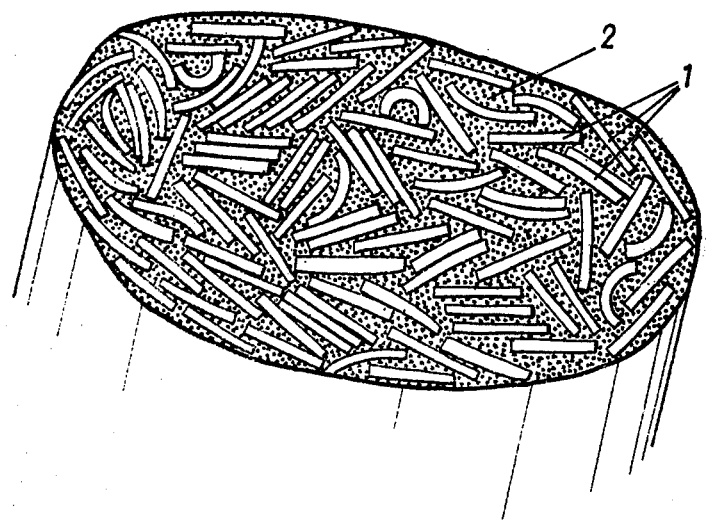

FIG. 2 shows a bundle consisting of enveloped single threads, the embedding mass again being denoted by 2 and the single threads by 1.

What I claim is:

1. Threads or fibres of polytetrafluorethylene having an improved heat conductibility, comprising thread or fibre cores having a certain weight, and envelopes having a certain weight and enclosing said thread or fibre cores, said envelopes having a certain content of fine-particle polytetrafluorethylene, a certain content of a heat conducting pigment and a certain content of a binder.

2. Threads or fibres as set forth in claim 1, wherein said heat conducting pigment is soot.

3. Threads or fibres as set forth in claim 1, wherein said heat conducting pigment is graphite.

4. Threads or fibres as set forth in claim 1, wherein the weight of said envelopes amounts to between 10 and 200% of the weight of said thread or fibre cores, and said content of said heat conducting pigment amounts to between 30 and 90% by weight.

5. Threads or fibres as set forth in claim 4, wherein the weight of said envelopes amounts to between 80 and 100% of the weight of said thread or fibre cores.

6. Threads or fibres as set forth in claim 4, wherein said content of said heat-conducting pigment amounts to 70% by weight.

7. Threads or fibres as set forth in claim 1, wherein said threads or fibres have titres of between 500 and 20,000 dtex.

8. Threads or fibres as set forth in claim 7, wherein said titres are between 10,000 and 20,000 dtex.

9. A sealing package using said threads or fibres as set forth in claim 1, wherein said threads or fibres are interlaced.

10. A method of producing threads or fibres of polytetrafluorethylene having an improved heat conductibility, comprising
    providing a filament or yarn core of polytetrafluorethylene and having a certain weight,
    providing an aqueous dispersion containing between 30 and 70% by weight of solids, said solids including between 30 and 90% by weight of conducting pigment, between 10 and 70% by weight of fine-particle polytetrafluorethylene, and maximally 5% by weight of emulsifying agent, said 5% by weight of the emulsifying agent being based on the amount of solids,
    immersing said filament or yarn core into said aqueous dispersion so as to avive said filament or yarn core with an envelope of said aqueous dispersion,
    squeezing off excessive aqueous dispersion from said avived filament or yarn core,
    drying said avived filament or yarn core,
    treating said avived filament or yarn core with an antifriction agent, and
    quilling said avived filament or yarn core.

11. A method as set forth in claim 10, wherein said aqueous dispersion contains between 50 and 60% by weight of solids.

12. A method as set forth in claim 10, wherein said conducting pigment is contained in an amount of 70% by weight.

13. A method as set forth in claim 10, wherein said conducting pigment is soot.

14. A method as set forth in claim 10, wherein said conducting pigment is graphite.

15. A method as set forth in claim 10, wherein said aqueous dispersion contains 30% by weight of fine-particle polytetrafluorethylene.

16. A method as set forth in claim 10, wherein said anti-friction agent is silicone fluid.

17. A method of producing threads or fibres of polytetrafluorethylene having an improved heat conductibility comprising
    providing a filament or yarn core of polytetrafluorethylene and having a certain weight,
    providing an aqueous dispersion containing between 30 and 70% by weight of solids, said solids including between 30 and 90% by weight of conducting pigment, between 10 and 70% by weight of fine-particle polytetrafluorethylene, and maximally 5% by weight of emulsifying agent, said 5% by weight of the emulsifying agent being based on the amount of solids, immersing said filament or yarn core into said aqueous dispersion so as to avive said filament or yarn core with an envelope of said aqueous dispersion, squeezing off excessive aqueous dispersion from said avived filament or yarn core, drying said avived filament or yarn core, and cutting said avived filament or yarn core so as to form staple fibres.

18. A method as set forth in claim 17, wherein said aqueous dispersion contains between 50 and 60% by weight of solids.

19. A method as set forth in claim 17, wherein said conducting pigment is contained in an amount of 70% by weight.

20. A method as set forth in claim 17, wherein said conducting pigment is soot.

21. A method as set forth in claim 17, wherein said conducting pigment is graphite.

22. A method as set forth in claim 17, wherein said aqueous dispersion contains 30% by weight of fine-particle polytetrafluorethylene.

23. A method as set forth in claim 10, wherein said aqueous dispersion has a viscosity of between 50 and 1,000 cP.

24. A method as set forth in claim 17, wherein said aqueous dispersion has a viscosity of between 50 and 1,000 cP.

25. A method as set forth in claim 23, wherein said viscosity amounts to between 100 and 200 cP.

26. A method as set forth in claim 24, wherein said viscosity amounts to between 100 and 200 cP.

27. A method as set forth in claim 10, wherein said envelope has a weight of between 10 and 200% of the weight of the filament or yarn core.

28. A method as set forth in claim 17, wherein said envelope has a weight of between 10 and 200% of the weight of the filament or yarn core.

29. A method as set forth in claim 27, wherein said weight of said envelope amounts to between 80 and 100% of the weight of the filament or yarn core.

30. A method as set forth in claim 28, wherein said weight of said envelope amounts to between 80 and 100% of the weight of the filament or yarn core.

31. A method as set forth in claim 10, wherein said avivated filament or yarn core has a titre of between 500 and 20,000 dtex.

32. A method as set forth in claim 17, wherein said avivated filament or yarn core has a titre of between 500 and 20,000 dtex.

33. A method as set forth in claim 31, wherein said titre is between 10,000 and 20,000 dtex.

34. A method as set forth in claim 32, wherein said titre is between 10,000 and 20,000 dtex.

* * * * *